United States Patent
Hamamoto et al.

(10) Patent No.: US 9,742,301 B2
(45) Date of Patent: Aug. 22, 2017

(54) ELECTRIC POWER CONVERSION DEVICE AND CONTROL CIRCUIT DETERMINING OCCURRENCE OF AN ABNORMALITY STATE

(71) Applicant: DENSO CORPORATION, Kariya, Aichi-pref. (JP)

(72) Inventors: Masashi Hamamoto, Nagoya (JP); Kimikazu Nakamura, Handa (JP); Kenta Hatakenaka, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/245,379

(22) Filed: Apr. 4, 2014

(65) Prior Publication Data

US 2014/0307480 A1 Oct. 16, 2014

(30) Foreign Application Priority Data

Apr. 10, 2013 (JP) .................................. 2013-082197
Mar. 6, 2014 (JP) .................................. 2014-043876

(51) Int. Cl.
  *H02H 7/122* (2006.01)
  *H02M 3/337* (2006.01)

(52) U.S. Cl.
  CPC ................................ *H02M 3/3376* (2013.01)

(58) Field of Classification Search
  CPC ............ H02M 1/32; H02M 1/34; H02M 3/28; H02M 3/335; H02M 7/5387; H02M 3/33569; H02M 3/3376; H02M 3/33507; H02M 7/53871
  USPC ... 363/15, 16, 17, 21.01, 21.04, 21.09, 21.1, 363/21.12, 21.17, 21.18, 50, 55, 56.01, 363/56.02, 56.05, 56.11, 97, 98
  See application file for complete search history.

(56) References Cited

U.S. PATENT DOCUMENTS 8,829,718 B2 * 9/2014 Ido ...................... H02M 3/3376
  307/10.1
2006/0132062 A1 * 6/2006 Maru ................ H02M 3/33592
  315/291

FOREIGN PATENT DOCUMENTS

| JP | 2007-097368 | 4/2007 |
| JP | 2009-118571 | 5/2009 |
| JP | 2009-142061 | 6/2009 |

OTHER PUBLICATIONS

English Translation of JP 2007-097368.*
English Translation of JP 2009-118571.*

* cited by examiner

*Primary Examiner* — Alex Torres-Rivera
(74) *Attorney, Agent, or Firm* — Nixon & Vanderhye PC

(57) ABSTRACT

An electric power conversion device has a transformer, a DC-AC conversion circuit, an AC-DC conversion circuit and a control circuit. The control circuit calculates an input current instruction value (Iref) based on a difference value ($\Delta V$) between an output voltage (Vout) of the AC-DC conversion circuit and an output voltage instruction value (Vref). A comparator compares an input current (Iin) of the DC-AC conversion circuit with the value (Iref). The DC-AC conversion circuit is controlled by the comparison result of the comparator. The control circuit correctly determines an occurrence of an abnormality state of the electric power conversion device based on the operation state of the comparator, the difference value ($\Delta V$) between the output voltage (Vout) of the AC-DC conversion circuit and the output voltage instruction value (Vref), and the input voltage (Vin) of the DC-AC conversion circuit without using any output current of the AC-DC conversion circuit.

6 Claims, 5 Drawing Sheets

ELECTRIC POWER CONVERSION DEVICE AND CONTROL CIRCUIT DETERMINING OCCURRENCE OF AN ABNORMALITY STATE

CROSS-REFERENCE TO RELATED APPLICATION

This application is related to and claims priority from Japanese Patent Application No. 2013-82197 filed on Apr. 10, 2013 and Japanese Patent Application No. 2014-43876 filed on Mar. 6, 2014, the contents of which are hereby incorporated by reference.

BACKGROUND OF THE INVENTION

1. Field of the Invention

The present invention relates to electric power conversion devices comprised of a transformer, a direct current-alternating current conversion circuit, an alternating current-direct current conversion circuit and a control circuit.

2. Description of the Related Art

There are known direct current-direct current converters (DC-DC converters). The DC-DC converter is comprised of a direct current-alternating current conversion circuit (DC-AC conversion circuit) and an alternating current-direct current conversion circuit (AC-DC conversion circuit). For example, patent document, Japanese patent laid open publication No. JP 2009-118571, which has disclosed a DC-DC converter.

The DC-DC converter further has a control circuit equipped with a central processing unit (CPU), a comparator, a drive circuit, etc. The CPU generates a target current instruction value on the basis of a difference between an output voltage of the DC-DC converter and a target voltage value. Further, the CPU generates and outputs a predetermined duty ratio and a plurality of pulse signals having a predetermined frequency. The comparator compares an absolute value of a current flowing in the transformer with the target current instruction value. When the comparison result of the comparator indicates that the absolute value of the current flowing in the transformer is smaller than the target current instruction value, a drive circuit in the control circuit outputs the pulse signal transmitted from the CPU as the drive signal to drive switching transistors, for example IGBTs.

On the other hand, when the comparison result of the comparator indicates that the absolute value of the current flowing in the transformer is larger than the target instruction current value, the comparator inhibits the pulse signals transmitted from the CPU to be used for driving the switching transistor. The drive circuit controls the operation of the switching transistors on the basis of the drive signals, i.e. the pulse signals output from the CPU. This control operation makes it possible to correctly adjust the output voltage of the DC-DC converter to the target voltage.

By the way, when the DC-DC converter enters an abnormality state, i.e. a malfunction, the DC-DC converter cannot correctly adjust the output voltage of the DC-DC converter to the target voltage. That is, looking from different angles, it is possible to detect the abnormality state of the DC-DC converter on the basis of a condition whether or not the output voltage of the DC-DC converter correctly equals to the target voltage. However, even if the DC-DC converter correctly works, the output voltage of the DC-DC converter is decreased when the output current of the DC-DC converter exceeds its rated current. In this case, it is difficult to correctly detect that the abnormality state of the DC-DC converter enters the abnormality state or a malfunction on the basis of the judgment result whether or not the output voltage exceeds its target voltage.

In order to solve the conventional problem previously described, there has been proposed a conventional technique which detects whether or not an output current of the DC-DC converter exceeds its rated current. The conventional technique judges occurrence of the abnormality state of the DC-DC converter on the basis of the detection result. However, this conventional technique requires one or more additional circuits for detecting the output current of the DC-DC converter. As a result, the DC-DC converter has a complicate structure and a manufacturing cost thereof increases.

There has been proposed another conventional technique which detects an output current of the DC-DC converter on the basis of a current flowing in the transformer, and judges whether or not the detected output current exceeds its rated current in order to judge occurrence of the abnormality state of the DC-DC converter. However, it is also difficult to correctly and precisely detect the output current of the DC-DC converter because characteristics of each of components forming the DC-DC converter vary due to a temperature and its production tolerance. Furthermore, it is necessary to perform a complicated process and needs a high performance CPU in order to detect the output current of the DC-DC converter with high accuracy.

SUMMARY

It is therefore desired to provide an electric power conversion device capable of judging occurrence of an abnormality state or a malfunction of the electric power conversion device with high accuracy without detecting and using any output current of the DC-DC converter.

An exemplary embodiment provides an electric power conversion device comprised of a transformer, a direct current-alternating current conversion circuit, an alternating current-direct current conversion circuit and a control circuit. The transformer is comprised of a primary winding and secondary windings. The direct current-alternating current conversion circuit is connected to the primary winding. The direct current-alternating current conversion circuit receives an input current (i.e. an input direct current) and converts the received direct input current to an alternating current. The direct current-alternating current conversion circuit supplies the alternating current to the primary winding of the transformer. The alternating current-direct current conversion circuit is connected to the secondary windings. The alternating current-direct current conversion circuit receives an alternating current supplied from the secondary windings, and converts the received alternating current to a direct current. The alternating current-direct current conversion circuit outputs the direct current.

The control circuit is comprised of a comparator. The control circuit calculates an input current instruction value on the basis of a difference between an output voltage of the alternating current-direct current conversion circuit and an output voltage instruction value. The comparator compares the input current with the input current instruction value. The control circuit controls operation of the direct current-alternating current conversion circuit. The control circuit determines an occurrence of an abnormality state of the electric power conversion device on the basis of a comparison result of the comparator and the difference between the output voltage of the alternating current-direct current conversion circuit and the output voltage instruction value.

According to the electric power conversion device having the structure previously described according to the exemplary embodiment, the control circuit generates the input current instruction value on the basis of the difference between the output voltage instruction value and the output voltage of the alternating current-direct current conversion circuit. The comparator compares the input current of the direct current-alternating current conversion circuit with the input current instruction value. The control circuit controls the operation of the direct current-alternating current conversion circuit on the basis of the comparison result. When the electric power conversion device works correctly, the comparator works correctly, i.e. functions correctly, and the comparison result of the comparator varies. As a result, the input current (i.e. the input direct current) flows in the direct current-alternating current conversion circuit and a current having a predetermined magnitude flows in the primary winding of the transformer. Accordingly, it is possible for the control circuit in the electric power conversion device to perform a correct judgment for detecting an occurrence of an abnormality state of the electric power conversion device on the basis of the operation state of the comparator in addition to the difference value between the output voltage of the alternating current-direct current conversion circuit and the output voltage instruction value without using any output current of the alternating current-direct current conversion circuit.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
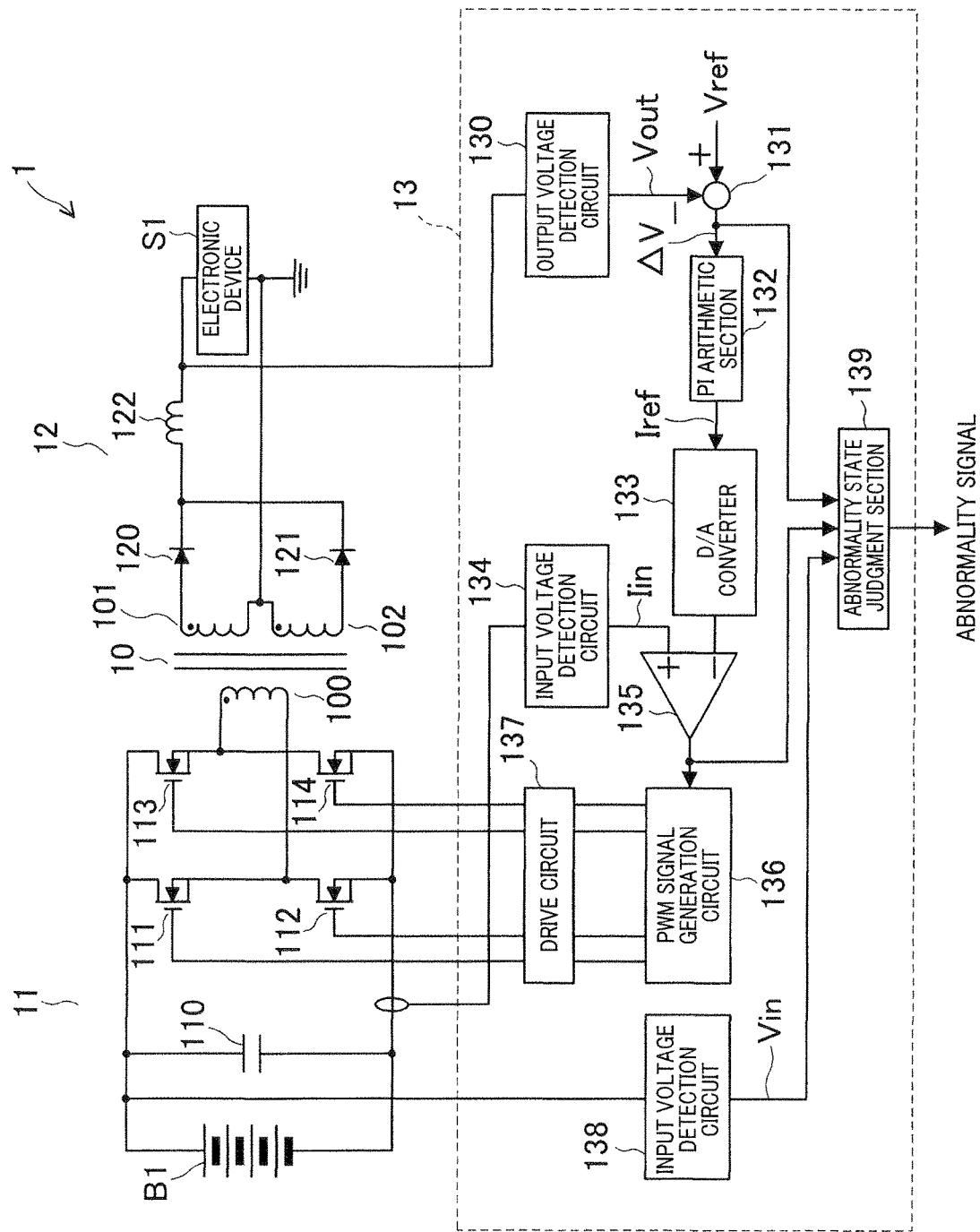
FIG. 1 is a schematic view showing a circuit diagram of an electric power conversion device according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

Exemplary Embodiment

A description will be given of a structure of an electric power conversion device 1 according to an exemplary embodiment with reference to FIG. 1 to FIG. 5.

FIG. 1 is a schematic view showing a circuit diagram of the electric power conversion device 1 according to the exemplary embodiment. The electric power conversion device 1 shown in FIG. 1 decreases a direct current (DC) voltage of a battery B1. The battery B1 is mounted to a motor vehicle. The electric power conversion device 1 supplies the decreased voltage to an electronic device S1. The electric power conversion device 1 performs the process of decreasing the DC voltage while the battery B1 is electrically insulated from the electronic device S1.

As shown in FIG. 1, the electric power conversion device 1 is comprised of a transformer 10, a direct current (DC) to alternating current (AC) conversion circuit 11 (hereinafter, the DC-AC conversion circuit 11), a AC-DC conversion circuit 12 and a control circuit 13.

An AC voltage is supplied to a primary side of the transformer 10. The transformer 10 decreases the AC voltage and outputs the decreased voltage to a secondary side of the transformer 10. The primary side in the transformer 10 is electrically insulated from the secondary side of the transformer 10. The transformer 10 is comprised of a primary winding 100 and a pair of secondary windings 101 and 102. One end terminal and the other end terminal of the primary winding 100 are connected to the DC-AC conversion circuit 11. The primary windings 101 and 102 are connected in series. Specifically, as shown in FIG. 1, one end terminal of the secondary winding 101 is connected to one end terminal of the secondary winding 102. The other end terminal of the secondary winding 101, the other end terminal of the secondary winding 102, and a connection node between the secondary winding 101 and the secondary winding 102 connected in series are connected to the AC-DC conversion circuit 12.

The DC-AC conversion circuit 11 is connected to the battery B1 and the primary winding 100. The DC-AC conversion circuit 11 converts a direct current supplied from the battery B1 to an alternating current.

The DC-AC conversion circuit 11 supplies the alternating current to the primary winding 100 of the transformer 10. The DC-AC conversion circuit is comprised of a capacitor 110 and switching elements 111 to 114.

The capacitor 110 receives the direct current supplied from the battery B1, smoothies the received direct current and outputs the smoothed direct current. One end terminal of the capacitor 110 is connected to a positive electrode terminal of the battery B1 and the other end terminal of the capacitor 110 is connected to a negative electrode terminal of the battery B1.

The switching elements 111 to 114 convert the smoothed direct current supplied from the capacitor 110 to an alternating current. The switching elements 111 to 114 output the alternating current to the primary winding 100 of the transformer 10. As shown in FIG. 1, the switching element 111 is connected in series to the switching element 112. Similarly, the switching element 113 is connected in series to the switching element 114.

Specifically, a source terminal of the switching element 111 is connected to a drain terminal of the switching element 112. Similarly, a source terminal of the switching element 113 is connected to a drain terminal of the switching element 114.

A first series connection element is composed of the switching element 111 and the switching element 112 connected in series. A second series connection element is composed of the switching element 113 and the switching element 114 connected in series. As show in FIG. 1, the first series connection element and the second series connection element are connected in parallel to the battery B1.

Specifically, a drain terminal of the switching element 111 and a drain terminal of the switching element 113 are connected to the positive electrode terminal of the battery B1. The source terminal of the switching element 112 and the source terminal of the switching element 114 are connected to the negative electrode terminal of the battery B1.

A gate terminal of each of the switching elements 111 to 114 is connected to the control circuit 13.

The AC-DC conversion circuit 12 is connected to the secondary windings 101 and 102, and further connected to the electronic device S1. The AC-DC conversion circuit 12 converts the alternating current supplied from the secondary windings 101 and 102 to a direct current, and supplies the converted direct current to the electronic device S1.

The AC-DC conversion circuit 12 is comprised of a reactor 122 and diodes 120 and 121.

As shown in FIG. 1, the diode 120 is connected to the secondary winding 101. Similarly, the diode 121 is connected to the secondary winding 102. The diodes 120 and 121 rectify the alternating current supplied from the secondary windings 101 and 102 to a direct current.

An anode terminal of the diode 120 is connected to one end of the secondary winding 101. A cathode terminal of the diode 120 is connected to the reactor 122. Similarly, an anode terminal of the diode 121 is connected to one end terminal of the secondary winding 102. A cathode terminal of the diode 121 is connected to the reactor 122.

The reactor 122 receives the converted direct current converted by the diodes 120 and 121, and smoothies the converted direct current. A first terminal of the reactor 211 is connected to the cathode terminal of the diode 120 and the cathode terminal of the diode 121. A second terminal of the reactor 122 is connected to a positive electrode terminal of the electronic device S1. A series connection node between the second winding 101 and the secondary winding 102 is connected to a body of the motor vehicle on which the electric power conversion device 1 according to the exemplary embodiment is mounted. The series connection node between the second winding 101 and the secondary winding 102 is also connected to a negative electrode terminal of the electronic device S1.

The control circuit 13 generates an input current instruction value on the basis of a difference between an output voltage instruction value and an output voltage of the AC-DC conversion circuit 12.

A comparator 135 compares an input current, i.e. an input direct current of the DC-AC conversion circuit 11 with an input current instruction value. This comparator 135 will be explained later in detail. The control circuit 13 controls the operation of the DC-AC conversion circuit 11 on the basis of the comparison result.

Further, the control circuit 13 detects an occurrence of an abnormality state of the DC-AC conversion circuit 11 and the AC-DC conversion circuit 12 on the basis of the comparison result of the comparator 135 and a difference between the output voltage of the AC-DC conversion circuit 12 and the output voltage instruction value.

When the input voltage of the DC-AC conversion circuit 11 is not more than an input voltage judgment threshold value Vth, the control circuit 13 does not adjust a duty ratio of a pulse width modulation (PWM) signal on the basis of the comparison result of the comparator 135. In this case, because the control circuit 13 generates and outputs a PWM signal having a predetermined duty ratio, the control circuit 13 judges occurrence of the abnormality state.

As shown in FIG. 1, the control circuit 13 is comprised of an output voltage detection circuit 130, a difference arithmetic section 131, a proportional integral (PI) arithmetic section 132, a D-A converter 133, an input current detection circuit 134, the comparator 135, a PWM signal generation section 136, a drive circuit 137, an input voltage detection circuit 138, an abnormality state judgment section 139.

A microcomputer and one or more software programs provide the function of the difference arithmetic section 131, the function of the PI arithmetic section 132, the function of the PWM signal generation section 136 and the function of the abnormality state judgment section 139.

The output voltage detection circuit 130 detects an output voltage of the AC-DC conversion circuit 12, converts the detected output voltage to digital data Vout, and outputs the digital data Vout.

An input terminal of the output voltage detection circuit 130 is connected to the second terminal of the reactor 122. An output terminal of the output voltage detection circuit 130 is connected to the difference arithmetic section 131. As previously described, the function of the difference arithmetic section 131 is obtained by the microcomputer and the software program.

The difference arithmetic section 131 calculates a difference value ΔV between the output voltage Vout supplied from the output voltage detection circuit 130 and the output voltage instruction value Vref which is determined in advance. Specifically, the difference arithmetic section 131 subtracts the output voltage Vout from the output voltage instruction value Vref, and outputs the calculated difference value ΔV to the PI arithmetic section 132, and the abnormality state judgment section 139. That is, as shown in FIG. 1, the difference arithmetic section 131 is connected to the output voltage detection circuit 130. The difference arithmetic section 131 is also connected to the PI arithmetic section 132 and the abnormality state judgment section 139.

The PI arithmetic section 132 performs a proportional integral calculation of the difference value ΔV transmitted from the difference arithmetic section 131. The PI arithmetic section 132 generates an input current instruction value Iref on the basis of the difference value ΔV, and outputs the input current instruction value Iref to the D-A converter 133. As shown in FIG. 1, the PI arithmetic section 132 is connected to the difference arithmetic section 131 and the D-A converter 133.

The D-A converter 133 receives the input current instruction value Iref as digital data transmitted from the PI arithmetic section 132. The D-A converter 133 converts the received input current instruction value Iref to an analogue current. An input terminal of the D-A converter 133 is connected to the PI arithmetic section 132. As previously explained, the PI arithmetic section 132 is formed by the function of the microcomputer (not shown) and the function of the software programs. The output terminal of the D-A converter 133 is connected to the comparator 135.

The input current detection circuit 134 detects an input current flowing in the DC-AC conversion circuit 11. The input current detection circuit 134 converts the detected input current to an analogue current Iin, and outputs the analogue current Iin to the comparator 135.

An input terminal of the input current detection circuit 134 is connected to a current sensor. The current sensor is clamped by a wiring through which the battery B1 is connected to the source terminal of the switching element 112, the source terminal of the switching element 114. An output terminal of the input current detection circuit 134 is connected to the comparator 134.

The comparator 135 compares the input current instruction value Iref as an analogue current with the input current value Iin as an analogue current at a predetermined time. The comparator 135 outputs a comparison result. Specifically, the comparator 135 compares a difference between the input current instruction value Iref and the input current value Iin, and generates a signal corresponding to the obtained difference, and outputs the signal. In more detail, when the input current value Iin reaches the input current instruction value Iref, the comparator 135 generates the signal of a high level, and outputs the signal of a high level during a predetermined period of time. An inverting input terminal of the comparator 135 is connected to the output terminal of the D-A converter 133, and a non-inverting input terminal of the comparator 135 is connected to the output terminal of the input current detection circuit 134. The output terminal of the comparator 135 is connected to the microcomputer (not shown), i.e. connected to the PWM signal generation section 136 and the abnormality state judgment section 139. As previously described, the PWM signal generation section 136 and the abnormality state judgment section 139 are provided by the function of the microcomputer and the function of the software programs.

The PWM signal generation section 136 generates PWM signals on the basis of the output signal, i.e. a comparison result of the comparator 135. The PWM signal generation section 136 outputs the generated PWM signal to the drive circuit 137. The PWM signal generation section 136 adjusts a duty ratio of the PWM signal on the basis of the comparison result output from the comparator 135.

As shown in FIG. 1, the PWM signal generation section 136 is connected to the output terminal of the comparator 135. The output terminals of the PWM signal generation section 136 is connected to the drive circuit 137.

The drive circuit 137 controls the switching operation of each of the switching elements 111 to 114 on the basis of the PWM signals transmitted from the PWM signal generation section 136.

The drive circuit 137 is connected to the microcomputer (not shown). That is, the drive circuit 137 is connected to the PWM signal generation section 136 which is realized by the function of the microcomputer and the function of the software programs. Further, the drive circuit 137 is connected to the gate terminal of each of the switching elements 111 to 114.

The input voltage detection circuit 138 detects an input voltage of the DC-AC conversion circuit 11, converts the detected input voltage to digital data Vin. The input voltage detection circuit 138 outputs the digital data Vin to the abnormality state judgment section 139. That is, an output terminal of the input voltage detection circuit 138 is connected to the abnormality state judgment section 139.

An input terminal of the input voltage detection circuit 138 is connected to the positive electrode terminal of the battery B1. That is, the input terminal of the input voltage detection circuit 138 is connected to one end of the capacitance 110 and the positive electrode terminal of the battery B1. The output terminal of the input voltage detection circuit 138 is connected to the abnormality state judgment section 139. The abnormality state judgment section 139 is realized by the function of the microcomputer (not shown) and the function of the software programs.

The abnormality state judgment section 139 receives the difference value $\Delta V$ transmitted from the difference arithmetic section 131 and the output signal indicating the comparison result transmitted from the comparator 135. The abnormality state judgment section 139 judges whether or not a failure occurs in the DC-AC conversion circuit 11 and-or the AC-DC conversion circuit 12 on the basis of the received difference value $\Delta V$ and the received output signal indicating the comparison result.

When the judgment result indicates that failure occurs, the abnormality state judgment section 139 generates and outputs abnormality signal to an external device (not shown). In particular, when the input voltage of the DC-AC conversion circuit 11 is not more than the input voltage judgment threshold value Vth, the abnormality state judgment section 139 judges that no failure occurs in the DC-AC conversion circuit 11 and the AC-DC conversion circuit 12, i.e., both the DC-AC conversion circuit 11 and the AC-DC conversion circuit 12 correctly work. Therefore the abnormality state judgment section 139 does not generate and output any abnormality signal.

As shown in FIG. 1, the abnormality state judgment section 139 is connected to the difference arithmetic section 131. The abnormality state judgment section 139 is further connected to the output terminal of the comparator 135 and the output terminal of the input voltage detection circuit 138.

A description will now be given of the operation of the electric power conversion device 1 according to the exemplary embodiment with reference to FIG. 1 and FIG. 2.

The output voltage detection circuit 130 shown in FIG. 1 detects the output voltage of the AC-DC conversion circuit 12, converts the detected output voltage to digital data Vout. The output voltage detection circuit 130 outputs the digital data Vout to the difference arithmetic section 131.

The difference arithmetic section 131 receives the digital data Vout transmitted from the output voltage detection circuit 130, and calculates a difference value $\Delta V$ between the received digital data Vout and the output voltage instruction value Vref. The output voltage detection circuit 130 outputs the calculated difference value $\Delta V$ to the PI arithmetic section 132 and the abnormality state judgment section 139.

When receiving the difference value $\Delta V$ transmitted from the difference arithmetic section 131, the PI arithmetic section 132 performs a proportional integral calculation of the difference value $\Delta V$ and generates the input current instruction value Iref on the basis of the proportional integral calculation of the difference value $\Delta V$. The PI arithmetic section 132 outputs the input current instruction value Iref to the D-A converter 133.

When receiving the input current instruction value Iref transmitted from the PI arithmetic section 132, the D-A converter 133 converts the received input current instruction value Iref to an analogue current, and outputs the analogue current to the comparator 135.

On the other hand, the input current detection circuit 134 detects an input current flowing in the DC-AC conversion circuit 11, converts the detected input current to an analogue current Iin, and outputs the analogue current Iin to the comparator 135.

When receiving the analogue current converted from the input current instruction value Iref transmitted from the D-A converter 133 and the analogue current Iin converted from the input current transmitted from the input current detection circuit 134, the comparator 135 compares them at a predetermined period of time, and generates an output signal regarding the comparison result. Specifically, when the input current Iin reaches the input current instruction value Iref, the comparator 135 outputs the output signal of a high level during the predetermined period of time to the PWM signal generation section 136 and the abnormality state judgment section 139.

When receiving the output signal regarding the comparison result transmitted from the comparator 135, the PWM signal generation section 136 generates the PWM signals on the basis of the received output signal regarding the comparison result transmitted from the comparator 135. The PWM signals are used for driving the switching elements 111 to 114. The PWM signal generation section 136 outputs the PWM signals to the drive circuit 137. When receiving the PWM signals transmitted from the PWM signal generation section 136, the drive circuit 137 controls the operation of each of the switching elements 111 to 114 on the basis of the received PWM signals, as shown in FIG. 2.

Figure 2:
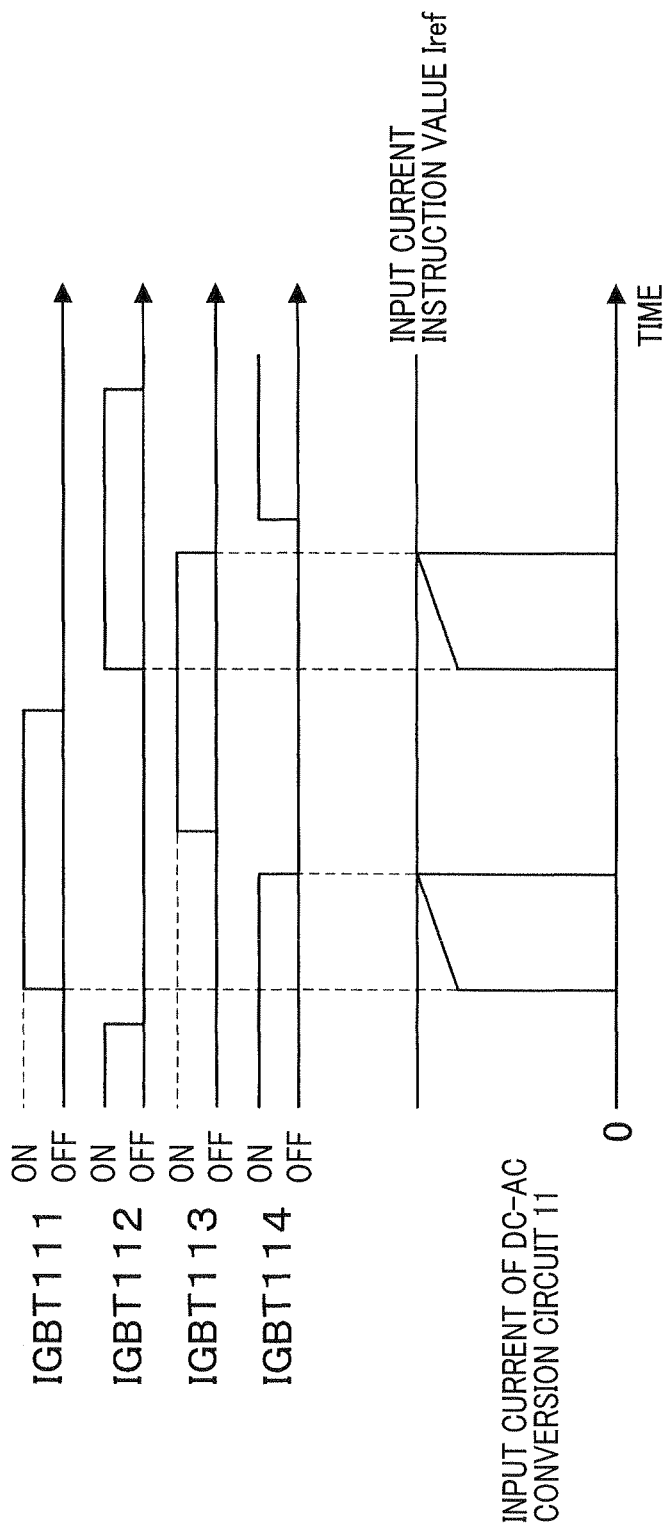
FIG. 2 is a timing chart showing a relationship between a switching state of each of switching elements (i.e. IGBTs) and an input current of a DC-AC conversion circuit in the electric power conversion device according to the exemplary embodiment of the present invention shown in FIG. 1.

FIG. 2 is a timing chart showing a relationship between a switching state of each of the switching elements 111 to 114, for example, IGBTs, and the input current of the DC-AC conversion circuit 11 in the electric power conversion device 1 according to the exemplary embodiment shown in FIG. 1.

As shown in FIG. 2, when the input current flows in the DC-AC conversion circuit 11, the direct current supplied from the battery B1 is converted to a rectangular-wave alternating current, and the rectangular-wave alternating current is supplied to the primary winding 100 of the transformer 10 shown in FIG. 1.

When the rectangular-wave alternating current is flowing in the primary winding 100 of the transformer 10, an alternating current having a decreased voltage is flowing in the secondary windings 101 and 102 of the transformer 10. When receiving the alternating current having the decreased voltage, the AC-DC conversion circuit 12 converts the received alternating current to a direct current, and supplies the direct current to the electronic device S1.

Next, a description will now be given of the abnormality state judgment operation performed by the electric power conversion device 1 according to the exemplary embodiment with reference to FIG. 1 and FIG. 3.

Figure 3:
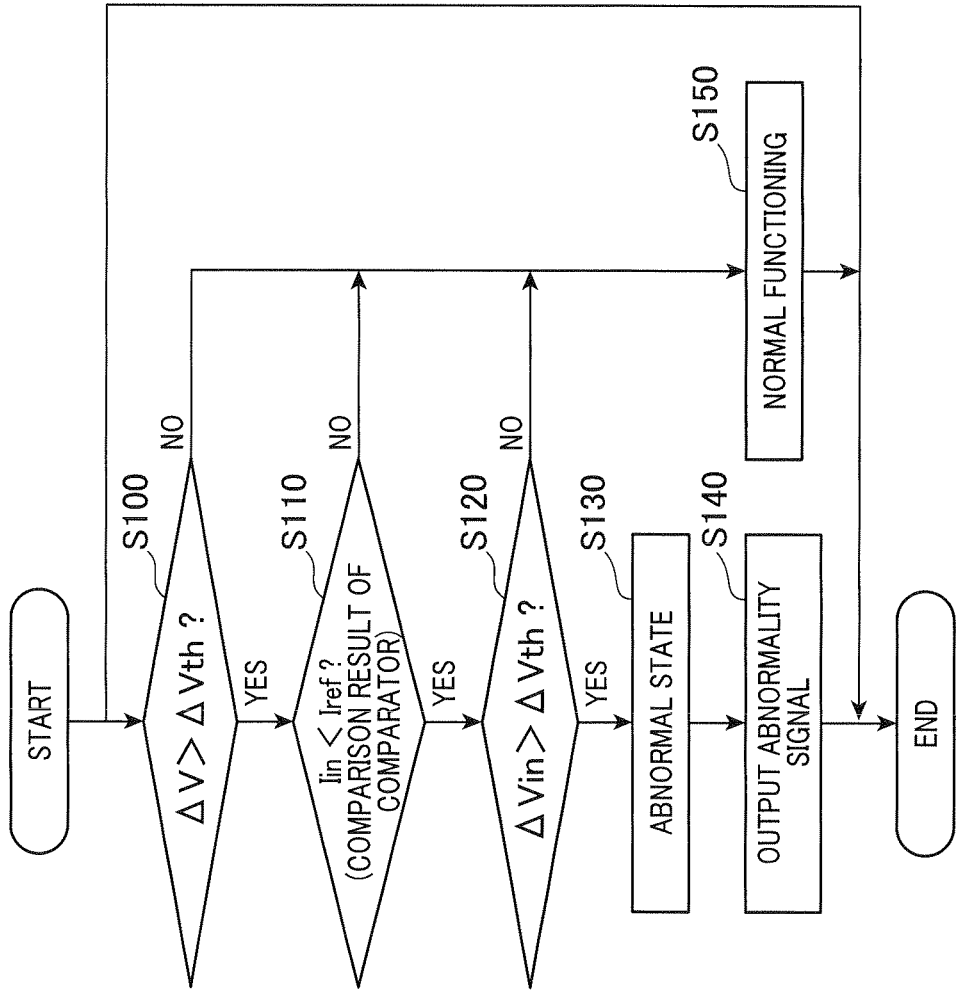
FIG. 3 is a flow chart of an abnormality state judgment process performed by an abnormality state judgment section in a control circuit in the electric power conversion device according to the exemplary embodiment of the present invention shown in FIG. 1.

FIG. 3 is a flow chart of the abnormality state judgment process performed by the abnormality state judgment section 139 in the control circuit 13 in the electric power conversion device 1 according to the exemplary embodiment shown in FIG. 1.

In step S100 in the flow chart shown FIG. 3, the abnormality state judgment section 139 shown in FIG. 1 detects whether or not a difference value ΔV between the output voltage Vout of the AC-DC conversion circuit 12 and the output voltage instruction value Vref is more than a difference judgment threshold value ΔVth. It is determined in advance so that the difference judgment threshold value ΔVth has the maximum value of a difference between the output voltage instruction value Vref and the output voltage Vout which is allowable when the electric power conversion device 1 works correctly, i.e. is in a functioning normally.

When the judgment result in step S100 indicates that the difference value ΔV is more than the difference judgment threshold value ΔVth ("YES" in step S100), the operation flow goes to step S110.

In step S110, the abnormality state judgment section 139 detects the operation state of the comparator 135. Specifically, the abnormality state judgment section 139 detects whether or not the comparator 135 now correctly works. In more detail, the abnormality state judgment section 139 detects whether or not the comparison result output from, i.e. the output signal of the comparator 135 indicates a low level signal. That is, the comparator 135 outputs the low level signal when the input current Iin transmitted from the input current detection circuit 134 is smaller than the input current instruction value Iref transmitted from the PI arithmetic section 132.

By the way, the input current Iin is usually more than the input current instruction value Iref excepting a rising time when the input voltage of the DC-AC conversion circuit 11 rises. As a result, the comparator 135 usually outputs the high level signal except at the rising time when the input voltage of the DC-AC conversion circuit 11 rises. Accordingly, the abnormality state judgment section 139 recognizes that the comparator 135 does not correctly work when the input current Iin is smaller than the input current instruction value Iref and the comparator 135 outputs the low level signal.

On the other hand, when the comparator 135 outputs the low level signal, i.e. the comparison result in step S110 indicates that the input current Iin is smaller than the input current instruction value Iref, the operation flow goes to step S120.

In step S120, the abnormality state judgment section 139 detects whether or not the input voltage Vin of the DC-AC conversion circuit 11 is more than the input voltage judgment threshold value Vth. The input voltage judgment threshold value Vth is the minimum value which is necessary for controlling that the output voltage of the AC-DC conversion circuit 12 becomes equal to the output voltage instruction value Vref.

When the detection result in step S120 indicates that the input voltage Vin of the DC-AC conversion circuit 11 is more than the input voltage judgment threshold value Vth, the abnormality state judgment section 139 recognizes that the abnormality state occurs. The abnormality state judgment section 139 generates and outputs the abnormality signal to an external device (not shown).

On the other hand, when the judgment result in step S100 indicates that the difference value ΔV is not more than the difference judgment threshold value ΔVth ("NO" in step S100), the operation flow goes to step S150.

Further, when the comparator 135 does not output any output signal having a low level, i.e. the comparison result of the comparator 135 in step S110 indicates that the input current Tin is not less than the input current instruction value Iref ("NO" in step S110), the operation flow goes to step S150.

Still further, when the detection result in step S120 indicates that the input voltage Vin of the DC-AC conversion circuit 11 is not more than the input voltage judgment threshold value Vth ("NO" in step S120), the operation flow goes to step S150.

In step S150, the abnormality state judgment section 139 recognizes that the electric power conversion device 1 correctly works. The operation flow returns to step S100.

A description will now be given of the effects of the electric power conversion device 1 according to the exemplary embodiment with reference to FIG. 1, FIG. 4 and FIG. 5.

Figure 4:
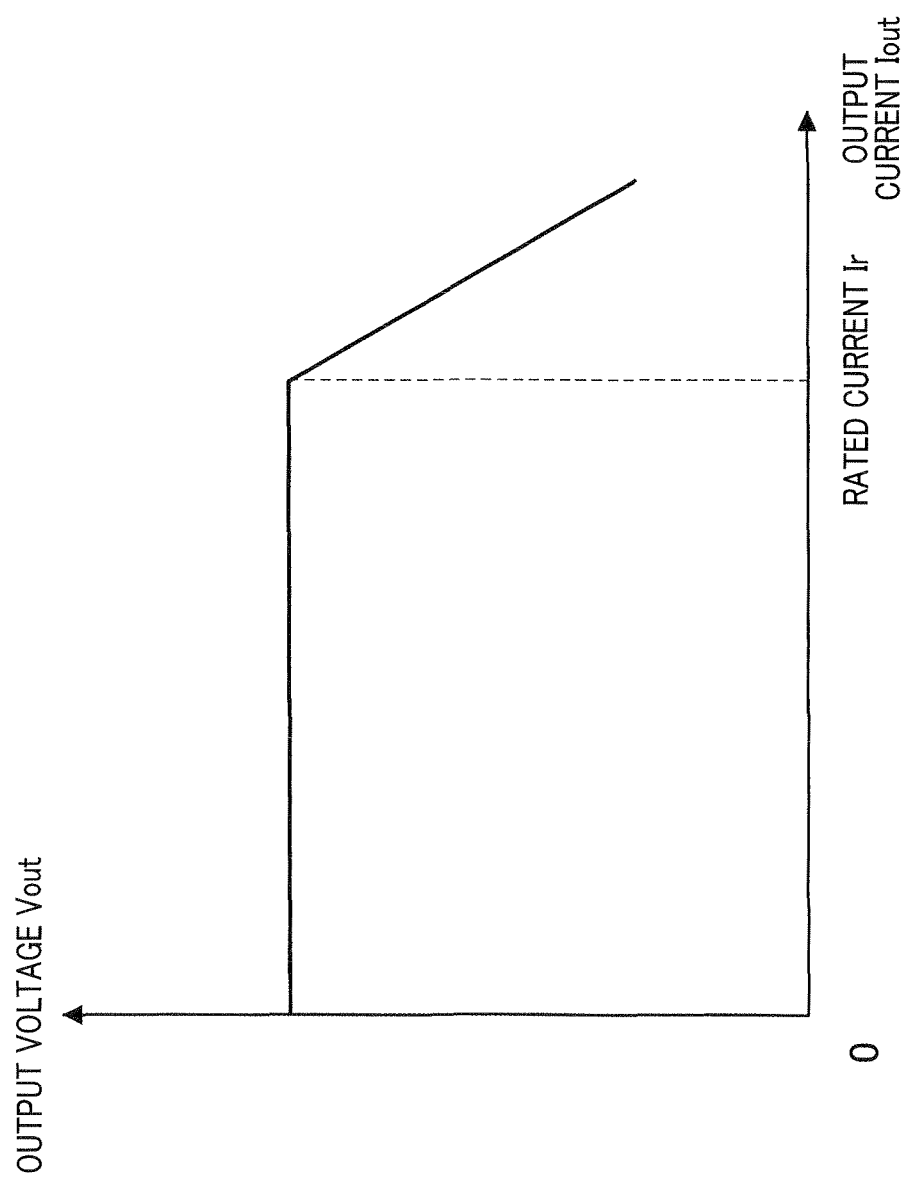
FIG. 4 is a view showing a relationship between an output current Iout and an output voltage Vout of the electric power conversion device according to the exemplary embodiment of the present invention shown in FIG. 1.

FIG. 4 is a view showing a relationship between an output current Iout and the output voltage Vout of the AC-DC conversion circuit 12 in the electric power conversion device 1 according to the exemplary embodiment shown in FIG. 1. FIG. 5 is a view showing a relationship between the input voltage Vin and the output voltage Vout of the electric power conversion device 1 according to the exemplary embodiment shown in FIG. 1.

The control circuit 13 shown in FIG. 1, i.e. the PI arithmetic section 132 in the control circuit 13 generates the input current instruction value Iref on the basis of the difference value ΔV between the output voltage Vout supplied from the output voltage detection circuit 130 and the output voltage instruction value Vref. The control circuit 13 controls the operation of the DC-AC conversion circuit 11 so that a necessary current is supplied to the primary winding 100 of the transformer 10 on the basis of the input current instruction value. Accordingly, when the electric power conversion device 1 correctly works in the normal operation mode, a current of a predetermined magnitude is supplied to the primary winding 100 of the transformer 10.

According to the exemplary embodiment, the control circuit 13 judges an occurrence of an abnormality state of the electric power conversion device 1 on the basis of the operation state of the comparator 135, the difference value ΔV between the output voltage Vout of the AC-DC conversion circuit 12 and the output voltage instruction value Vref. Specifically, when the comparator 135 does not correctly work and the difference value ΔV between the output voltage Vout of the AC-DC conversion circuit 12 and the output voltage instruction value Vref is more than the difference judgment threshold value ΔVth, the control circuit 13, i.e. the abnormality state judgment section 139 determines that an abnormality state occurs in the electric power conversion device 1. In more detail, the abnormality state judgment section 139 determines the occurrence of the abnormality state when the comparison result of the comparator 135 indicates that the input current Tin is smaller than the input current instruction value Iref and when the difference value ΔV between the output voltage Vout and the output voltage instruction value Vref is more than the difference judgment threshold value ΔVth. This makes it possible for the control circuit 13 to detect occurrence of the abnormality state without using the output current of the electric power conversion device 1.

Figure 5:
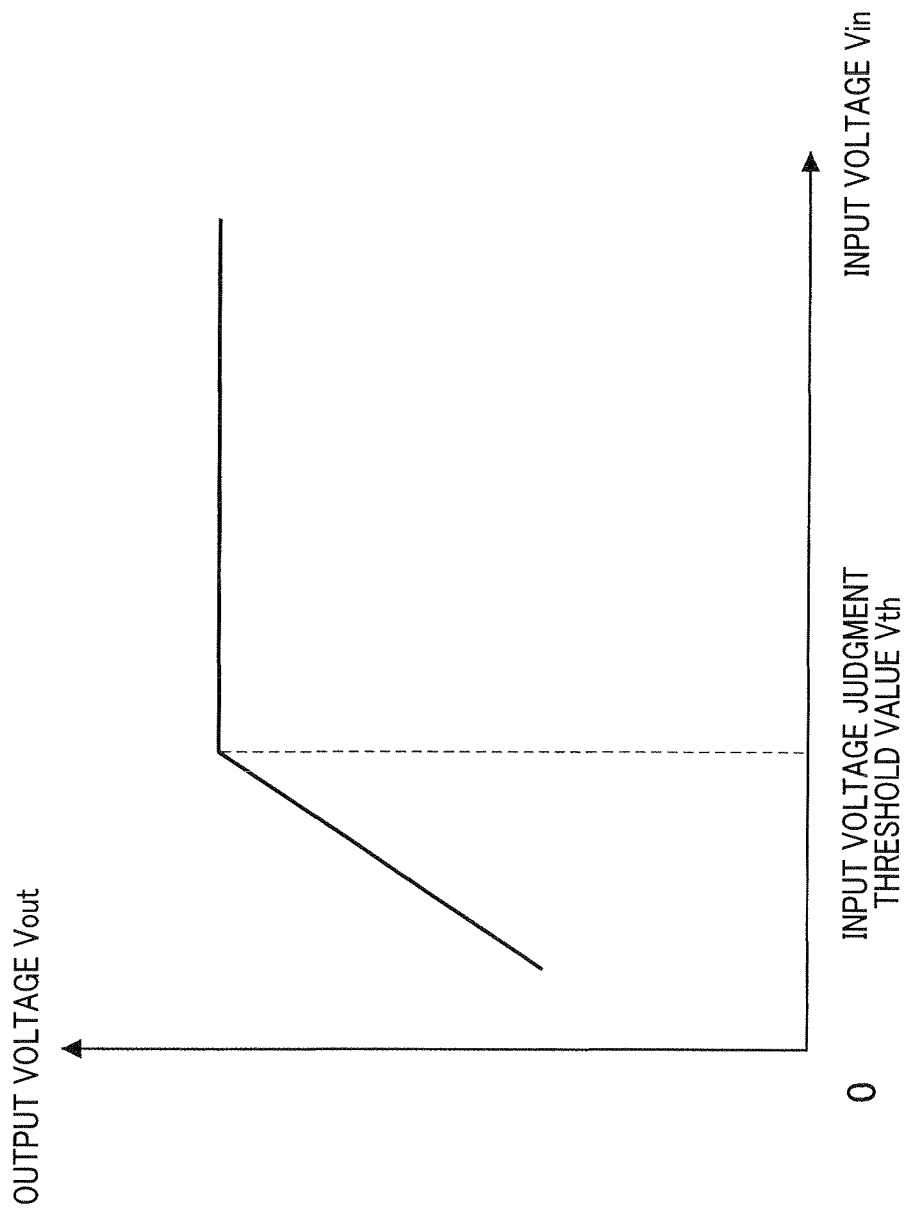
FIG. 5 is a view showing a relationship between an input voltage Vin and the output voltage Vout of the electric power conversion device according to the exemplary embodiment of the present invention shown in FIG. 1.

For example, when the input voltage Vin of the DC-AC conversion circuit 11 shown in FIG. 11 is not more than the difference judgment threshold value ΔVth, it is difficult to adjust the output voltage Vout of the AC-DC conversion circuit 12 to the output voltage instruction value Vref, as shown in FIG. 5. In this case, the control circuit 13 would cause an incorrect judgment if determining that the abnormality state occurs in the electric power conversion device 1 on the basis of the operation state of the comparator 135, the difference value ΔV between the output voltage Vout of the AC-DC conversion circuit 12 and the output voltage instruction value Vref.

On the other hand, according to the exemplary embodiment previously described in detail, because the control circuit 13 does not determine the occurrence of the abnormality state when the input voltage Vin of the DC-AC conversion circuit 11 is not more than the difference judgment threshold value ΔVth. This makes it possible to avoid incorrect judgment caused by a drop of the input voltage Vin.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An electric power conversion device comprising:
a transformer comprising a primary winding and secondary windings;
a direct current-alternating current conversion circuit connected to the primary winding, configured to receive an input current, convert the input current to an alternating current, and supply the alternating current to the primary winding of the transformer;
an alternating current-direct current conversion circuit connected to the secondary windings, configured to receive an alternating current supplied from the secondary windings, convert the alternating current to a direct current, and output the direct current; and
a control circuit comprising a comparator operating under a current mode control and an abnormality state judgment section;
the control circuit being configured to calculate an input current instruction value on a basis of a difference between an output voltage of the alternating current-direct current conversion circuit and an output voltage instruction value, the comparator being configured to compare the input current with the input current instruction value, and the control circuit configured to control operation of the direct current-alternating current conversion circuit on a basis of a comparison result of the comparator, and the abnormality state judgment section determines that the electric power conversion device operates under a normal mode when the comparator operating under the current mode control outputs an output signal which indicates that the input current of the direct current-alternating current conversion circuit is not less than the input current instruction value, and determines an occurrence of an abnormality state in the electric power conversion device when:
(a) the comparator operating under the current mode control outputs the output signal which indicates that the input current of the direct current-alternating current conversion circuit is less than the input current instruction value,
(b) the difference between the output voltage of the alternating current-direct current conversion circuit and the output voltage instruction value is more than a difference judgment threshold value,
wherein the difference judgment threshold value is set in advance to a maximum value of a difference between the output voltage instruction value and the output voltage of the alternating current-direct current conversion circuit, the output voltage is an allowable value when the electric power conversion device works correctly, and
(c) an input voltage of the direct current-alternating current conversion circuit is more than an input voltage judgment threshold value,
wherein the input voltage judgment threshold value is set in advance to a minimum value which is necessary for adjusting the output voltage of the alternating current-direct current conversion circuit to the output voltage instruction value.

2. The electric power conversion device according to claim 1, wherein the abnormality state judgment section judges the occurrence of the abnormality state of the electric power conversion device when the comparator outputs the output signal having a level other than a predetermined level, and the difference between the output voltage of the alternating current-direct current conversion circuit and the output voltage instruction value is more than the difference judgment threshold value.

3. The electric power conversion device according to claim 2, wherein the abnormality state judgment section determines no occurrence of the abnormality state of the electric power conversion device when the input voltage of the direct current-alternating current conversion circuit is not more than the input voltage judgment threshold value.

4. The electric power conversion device according to claim 3, wherein the abnormality state judgment section uses the input voltage judgment threshold value which is a minimum value necessary for controlling that the output voltage of the alternating current-direct current conversion circuit becomes equal to the output voltage instruction value.

5. The electric power conversion device according to claim 1, wherein the abnormality state judgment section determines no occurrence of the abnormality state of the electric power conversion device when the input voltage of the direct current-alternating current conversion circuit is not more than the input voltage judgment threshold value.

6. The electric power conversion device according to claim 5, wherein the abnormality state judgment section uses the input voltage judgment threshold value which is a minimum value necessary for controlling that the output voltage of the alternating current-direct current conversion circuit becomes equal to the output voltage instruction value.

* * * * *